United States Patent
Klein et al.

(10) Patent No.: US 6,519,518 B1
(45) Date of Patent: Feb. 11, 2003

(54) METHOD FOR DETECTING MOTOR CONTROL LOSS IN A POWER STEERING SYSTEM

(75) Inventors: Steven D. Klein, Munger, MI (US); Scott M. Wendling, Montrose, MI (US); Jeffrey T. Klass, Kawkawlin, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/002,324

(22) Filed: Nov. 1, 2001

Related U.S. Application Data
(60) Provisional application No. 60/309,434, filed on Aug. 1, 2001.

(51) Int. Cl.[7] .............................. G06F 17/00; B62D 5/04
(52) U.S. Cl. ............................. 701/41; 701/43; 701/34; 180/404; 180/445
(58) Field of Search .............................. 701/41, 42, 43, 701/29, 34, 89, 69; 340/438; 180/242, 404, 408, 410, 411, 412, 413, 445, 446

(56) References Cited

U.S. PATENT DOCUMENTS

| | | | |
|---|---|---|---|
| 5,083,628 A | * | 1/1992 | Kanazawa et al. .......... 180/415 |
| 5,257,191 A | * | 10/1993 | Takehara et al. ............ 180/182 |
| 5,365,440 A | * | 11/1994 | Abe et al. .................... 180/408 |
| 5,554,969 A | * | 9/1996 | Eguchi ........................ 180/236 |

* cited by examiner

*Primary Examiner*—Tan Q. Nguyen
(74) *Attorney, Agent, or Firm*—Edmund P. Anderson

(57) ABSTRACT

A method for detecting a loss of motor control in an electric power steering system is disclosed. In an exemplary embodiment, the method includes determining a duty cycle of a steering command signal generated by a controller. The steering command signal commands a steering mechanism to be turned in either a first or a second direction, the second direction being opposite to the first direction. A steering velocity of the steering mechanism is determined, the steering velocity being characterized by a steering velocity magnitude and a steering velocity direction whenever the steering velocity is greater than zero. The steering velocity direction corresponds to either the first or the second direction. The duty cycle is then compared to a first selected value, and the steering velocity magnitude is compared to a second selected value. If the duty cycle exceeds the first selected value, the steering velocity magnitude exceeds the second selected value, and the steering velocity direction is opposite to the direction commanded by the steering command signal, then a fault signal is generated.

21 Claims, 4 Drawing Sheets

METHOD FOR DETECTING MOTOR CONTROL LOSS IN A POWER STEERING SYSTEM

CROSS REFERENCE TO RELATED APPLICATIONS

This application claims the benefit of U.S. provisional application No. 60/309,434 filed Aug. 1, 2001, the contents of which are incorporated by reference herein in their entirety.

BACKGROUND

The present disclosure relates generally to automobile steering systems and, more particularly, to a method for detecting a loss of motor control in a power steering such as a four-wheel steering system.

A four-wheel steering system simultaneously steers the front and rear wheels of an automobile. More specifically, an electrically driven, rack and pinion rear wheel steer system produces a desired rear wheel steering angle to improve directional stability at high speeds and steering maneuverability at low speeds. Four-wheel steering methods include a "common phase" method and a "reverse phase" steering method. The common phase steering method reduces vehicle yaw (an angular speed about a vertical line passing through a center of gravity of a vehicle) by steering the front and rear wheels in the same direction. In contrast, the reverse phase steering method achieves good steering at low speeds by steering the front and rear wheels in opposite directions, thereby reducing the turning radius of the vehicle.

When a malfunction of a four-wheel or rear-wheel steering system occurs during the operation of an automobile, a "return to center" mechanism (such as a spring) typically assists the rear wheels in returning to a neutral position. However, such a spring force by itself would tend to create a return to center steer velocity higher than desired, thus causing an undesirable disturbance to an operator of the automobile.

SUMMARY

The above discussed and other drawbacks and deficiencies of the prior art are overcome or alleviated by a method for detecting a loss of control an electric power steering system. In an exemplary embodiment, the method includes determining a duty cycle of a steering command signal generated by a controller. The steering command signal commands a steering mechanism to be turned in either a first or a second direction, the second direction being opposite to the first direction. A steering velocity of the steering mechanism is determined, the steering velocity being characterized by a steering velocity magnitude and a steering velocity direction whenever the steering velocity is greater than zero. The steering velocity direction corresponds to either the first or the second direction. The duty cycle is then compared to a first selected value, and the steering velocity magnitude is compared to a second selected value. If the duty cycle exceeds the first selected value, the steering velocity magnitude exceeds the second selected value, and the steering velocity direction is opposite to the direction commanded by the steering command signal, then a fault signal is generated.

In a preferred embodiment, the fault signal causes a motor shorting relay to be de-energized, thereby causing the open motor phase windings to be short-circuited. The first selected value is preferably about 80% and the second selected value is preferably about 1 degree per second.

BRIEF DESCRIPTION OF THE DRAWINGS

Referring to the exemplary drawings wherein like elements are numbered alike in the several Figures.

DETAILED DESCRIPTION

Figure 1:
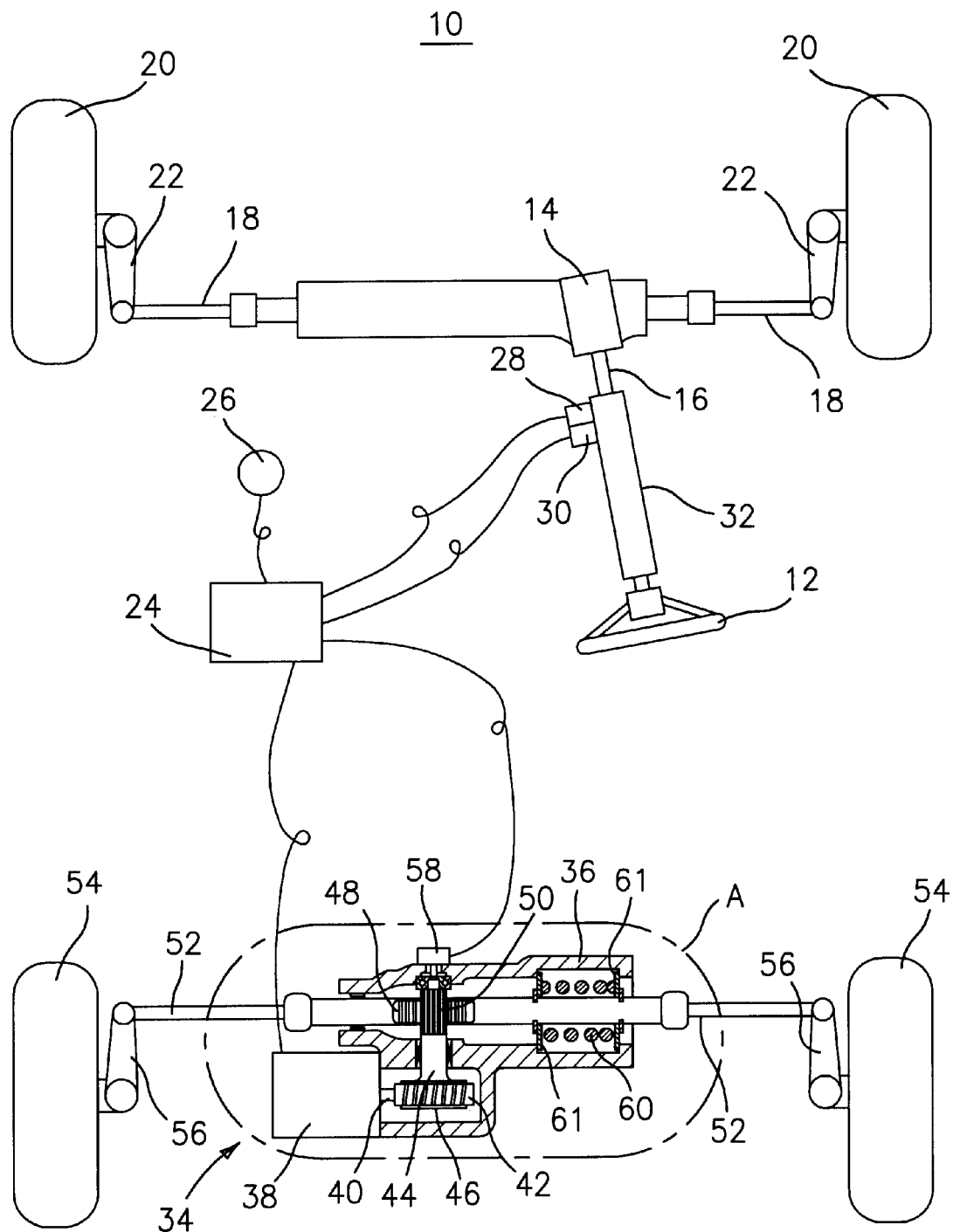
FIG. 1 is a schematic diagram of a four wheel, electric power steering system suitable for implementation with an embodiment of the invention.

Referring initially to FIG. 1, there is shown a schematic diagram of an exemplary four-wheel steering system 10. As a steering wheel 12 is turned, the rotational action imparted thereon is transmitted to a steering gear 14 through a steering shaft 16 which engages a toothed rack and pinion gear or integral gear (not shown), thereby displacing front wheel tie rods 18 and giving a desired steering angle to front wheels 20 through front steering knuckles 22.

A power steering assist may also be provided to the front wheels 20 with an electric or hydraulic actuator (not shown). In the case of electric power steering assist, a controller 24 receives input signals from a speed sensor 26 and torque 28 and steering angle sensors 30 disposed on steering column 32. The controller 24 determines the required assist torque and provides it to the front wheels 20 through an electric motor (not shown) coupled to the front rack (not shown).

In addition to front wheel steering, system 10 also provides rear wheel steering through an actuator 34 substantially disposed within housing 36. Actuator 34 includes a reversible electric motor 38 having an output shaft 40 connected to a worm 42 in meshing engagement with a transmission shaft 44 through worm wheel 46. The transmission shaft 44 is also in meshing engagement with a rear steering rack 48 through pinion gear 50, thereby displacing rear wheel tie rods 52, and giving a desired steering angle to rear wheels 54 through rear steering knuckles 56. In the embodiment depicted in FIG. 1, the controller 24 may also be used to provide a torque command to electric motor 38. Accordingly, a displacement sensor 58 is used to detect the displacement of rear wheel tie rods 52, and hence determine the rear steering angle for feedback to the controller 24.

Figure 2:
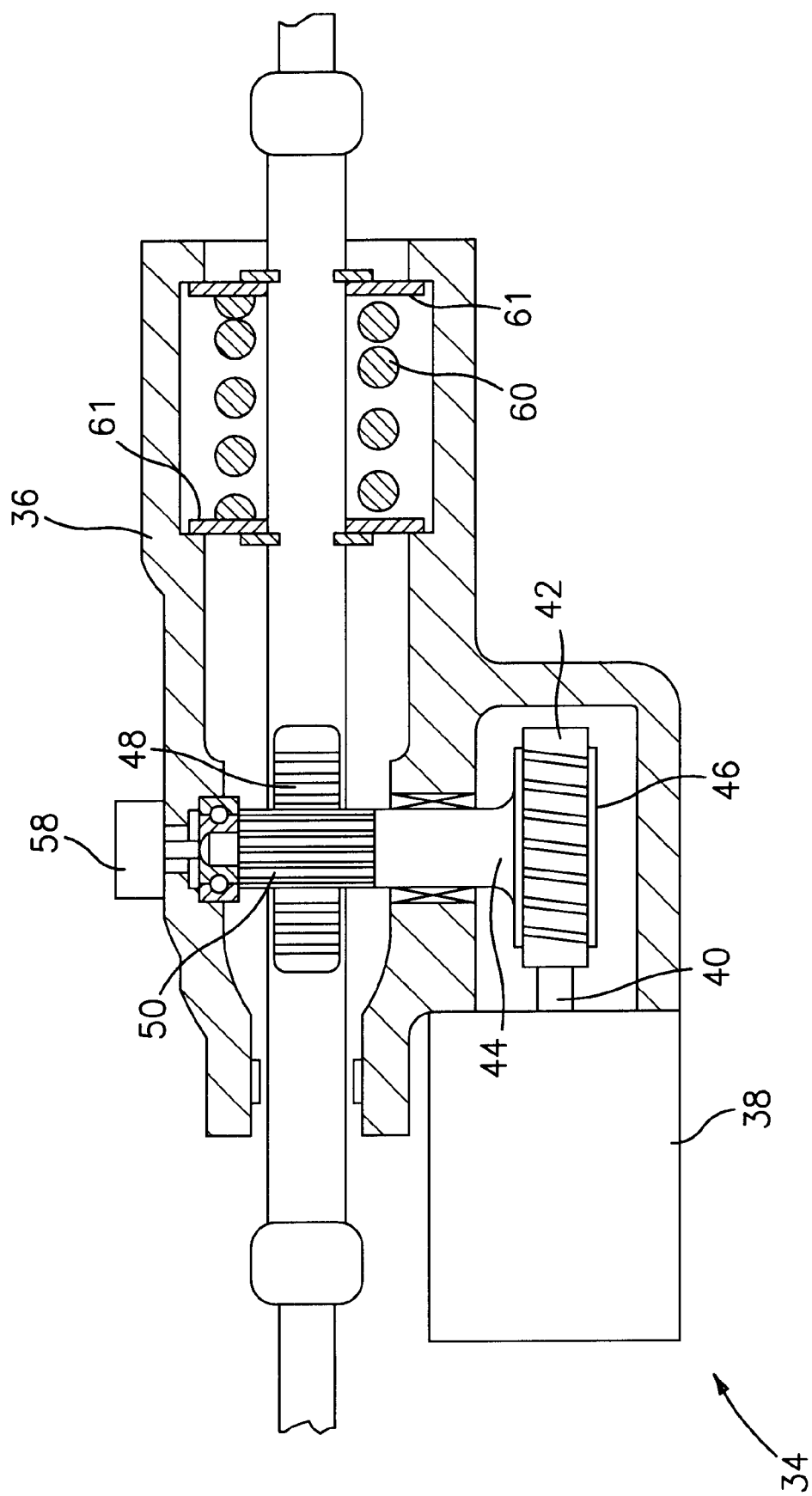
FIG. 2 is an enlargement of section A in FIG. 1.

It will be appreciated that the particular steering system 10 depicted in FIGS. 1 and 2 is intended to be exemplary in nature only. Other specific steering systems or supporting mechanisms are also contemplated. For example, steering system 10 could further include a two-stage, planetary reduction gear assembly (not shown) configured between the motor 38 and the steering rack 48.

As seen in both FIGS. 1 and 2, a return spring 60 is disposed between washer plates 61, and thus provides a "return to center" force that returns the rear steering rack 48 to a center, or neutral position upon a detected failure in the rear steering system. As will be described hereinafter, depending upon the status (i.e., open or closed) of a motor shorting relay, the electric motor 38 may be damped. Motor damping refers to the amount of retarding force that opposes the electric motor rotation. Without motor damping, there is little resistance offered by motor 38 for a return to center force imparted thereon by return spring 60, which may have a preload bias, for example, of approximately 1500 Newtons (N).

In order to achieve a rapid stopping or damping of the motor, the kinetic energy of the rotating motor shaft 40 must be quickly dissipated. To this end, dynamic braking takes advantage of the fact that a coasting DC motor acts like an electrical generator. In dynamic braking, a resistance is shunted across the stator windings, thereby allowing the energy of the coasting rotor to be converted to electrical energy and dissipated within the resistance as heat.

Figure 3:
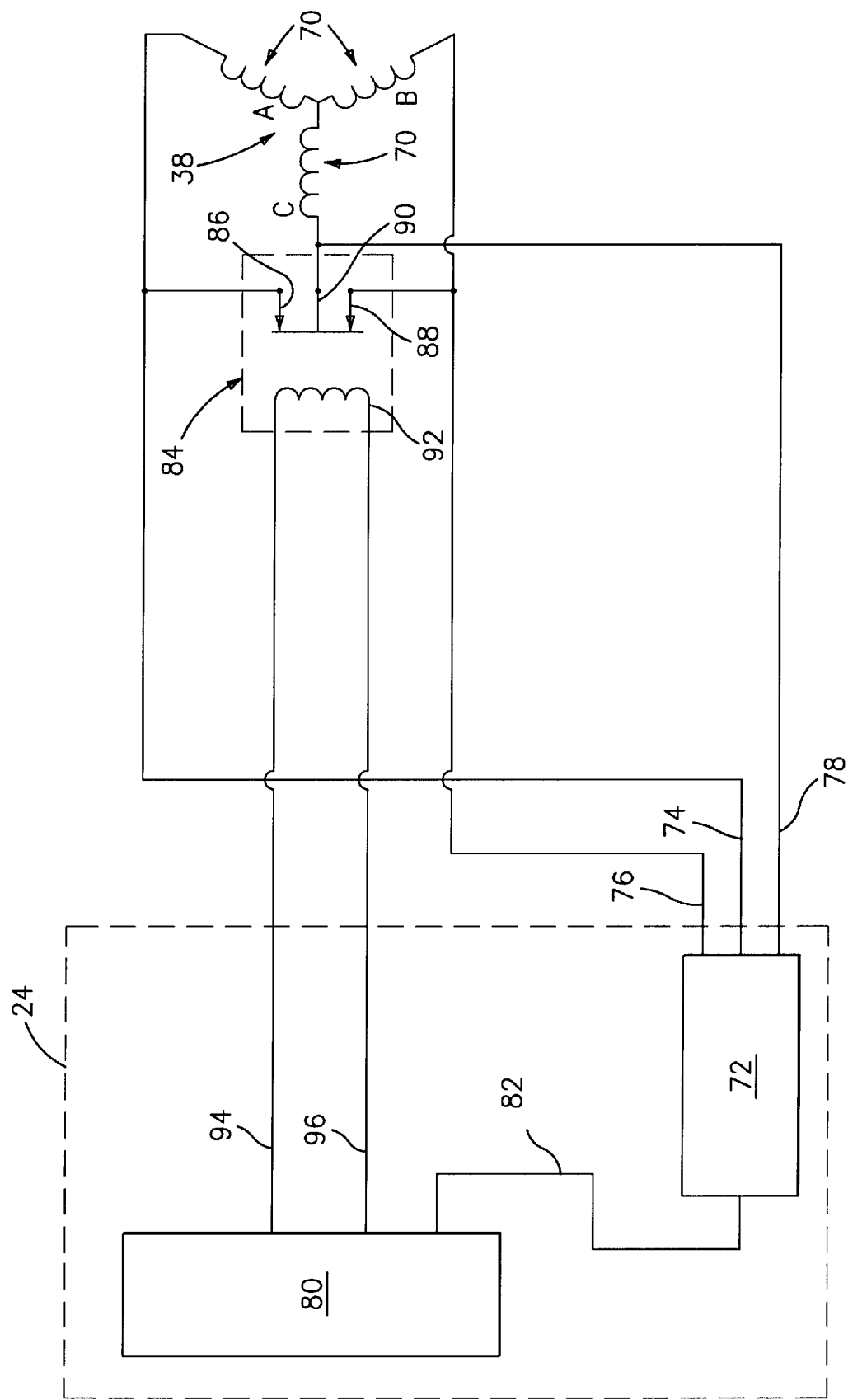
FIG. 3 is a schematic diagram of an electric motor, shorting relay and associated control circuitry used to actuate the steering system shown in FIG. 1.

Thus, as shown in FIG. 3, the motor 38 has a plurality of phase windings 70 associated therewith. Windings 70 are preferably located within a stator (not shown) of motor 38. In a preferred embodiment, the motor 38 is a brushless, direct current motor having three phase windings 70, designated by "A", "B" and "C" in FIG. 3. A motor driver circuit 72 provides the excitation current to the motor phase windings 70 through current carrying conductors 74, 76 and 78. The motor driver circuit 72 may provide a sinusoidal excitation input or a trapezoidal excitation input to phase windings 70. Generally, the excitation voltages generated by motor driver circuit 72 are 120 electrical degrees apart from one another in order to maximize torque performance of the motor 38. A steering command signal 82 is sent from microprocessor 80 to motor driver circuit 72. The steering command signal 82 further has a duty cycle or pulse width modulation (PWM) in proportion to the degree of error sensed between the actual steering position and the desired steering position. Both the motor driver circuit 72 and the microprocessor 80 may be located within controller 24.

As stated previously, a motor shorting relay 84 is connected in parallel with the motor phase windings 70. In the embodiment shown, relay 84 has three separate, normally closed contacts 86, 88 and 90. Contacts 86 and 88 are moveable contacts, whereas contact 90 is a fixed or stationary contact. Each of the contacts is connected to a separate phase winding 70 of motor 38. The relay 84, being an electromagnetic relay, has an electromagnetic coil 92 or solenoid which, when energized, causes normally closed contacts 86, 88 to open. The coil 92 is controlled and energized by microprocessor 80 through conductors 94 and 96. Thus configured, it will be seen that the coil 92 must remain energized in order for the motor 38 to run.

A failure of steering system 10 may occur for reasons such as (for example) a loss of speed signal, a loss of steering angle signal, and/or a loss of power to the steering assist motor 38, among others. In any such case, it is desirable to minimize the extent of a potential disturbance to a driver as a result therefrom. However, in the event that open phase windings 70 are not detected during the runtime of steering system 10, the motor damping may be hindered, thus increasing driver disturbance during a subsequent, rapid return to center operation.

It is conceivable that a loss of control over the motor 38 could occur while, at the same time, relay 84 is held open by microprocessor 80 in controller 24. This could happen, for example, as a result of motor phase wires 74, 76, 78 being severed between motor 38 and controller 24, or perhaps as a result of a connector (not shown) becoming separated from the controller 24. In either situation, power to the motor 38 is interrupted, thereby resulting in spring 60 forcing a return to center of the rear steering rack 48. However, since the loss of motor current to the windings 70 is "unintended", the controller 24 might not automatically remove power from the relay 84 so as to allow the windings 70 to be shorted for damping purposes. As a result, a return to center initiated by spring 60 is substantially unopposed by motor 38, thereby leading to the undesired driver disturbance.

Figure 4:
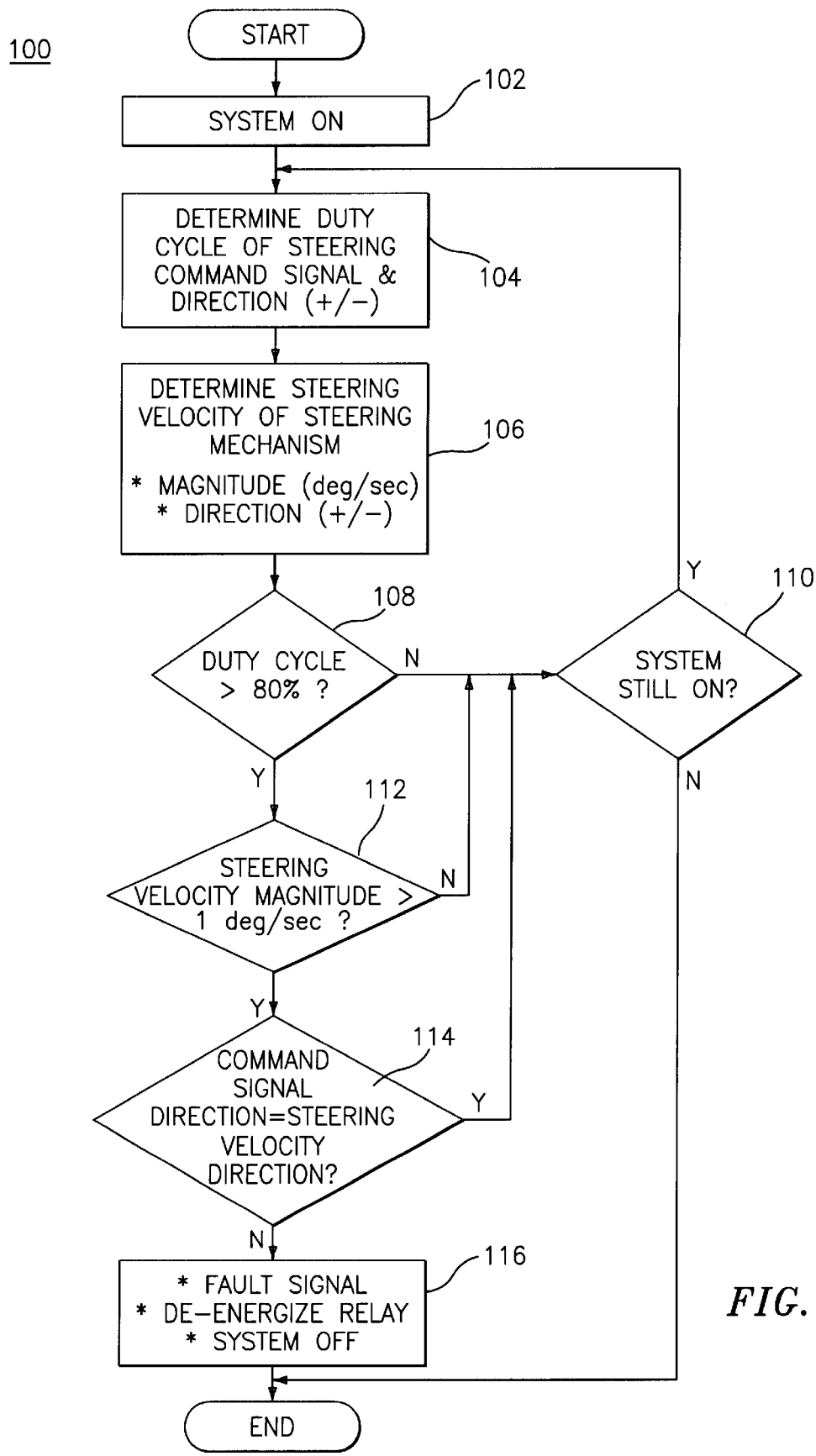
FIG. 4 is a flow diagram illustrating a method for detecting open motor phase windings for a motor implemented in an electric power steering system, in accordance with an embodiment of the invention.

Therefore, in accordance with an embodiment of the invention, a method for detecting open motor phase windings, during a loss of motor control, is disclosed. Referring now to FIG. 4, there is shown a flow diagram illustrative of the present method embodiments. Method 100 begins at block 102 upon power up of the steering system 10. At block 104, the duty cycle of the steering command signal 82 is determined, as well as the direction thereof. The duty cycle may be expressed as a percentage which represents the time that signal 82 is "on" divided by the time "on" plus the time "off". The direction of the steering command signal dictates in which direction motor 38 will cause rear steering rack 48 to turn. For example, a first (or positive) direction may be to the right, whereas a second (or negative) direction may be to the left.

Then, at block 106, the actual steering velocity of the steering mechanism (i.e., rear steering rack 48) is determined. The steering mechanism velocity has a magnitude component (referred to hereinafter as steering velocity magnitude) and a directional component (referred to hereinafter as steering velocity direction). By way of example, the steering velocity magnitude may be expressed in degrees per second, representing the change in angular position of the wheels as a function of time. The steering velocity direction, again, represents either the first direction (positive) or the second direction (negative).

If control over the motor 38 is lost during operation of the steering system, as discussed above, the return spring 60 will begin to act upon the rear steering rack 48, returning it to the center or neutral position. At the same time, the change in position of the steering rack 48 may generate an error signal level large enough to cause an increased duty cycle of the steering command signal 82. Moreover, if the steering velocity direction is also opposite to that of the direction of the command signal 82, a driver disturbance is likely to occur.

Thus, at decision block 108, a determination is made as to whether the duty cycle of the command signal is greater than a first selected value. In the embodiment depicted, the first selected value is chosen to be about 80%. However, those skilled in the art will appreciate that other calibration values may be selected, depending upon system requirements. If the command signal duty cycle does not exceed 80%, then method 100 returns to block 104 if the system is still activated (as determined at decision block 110). If the system is no longer activated, the method 100 comes to an end. However, if the command signal duty cycle does exceed 80%, then method 100 proceeds to decision block 112.

At decision block 112, a determination is then made as to whether the steering velocity magnitude is greater than a second selected value. In the embodiment depicted, the second selected value is chosen to be about 1 degree per second. Again, however, those skilled in the art will appreciate that other calibration values for the second selected value may be used, depending upon system requirements. If the steering velocity magnitude does not exceed 1 degree per second, then it is assumed that no significant driver disturbance is eminent, and method proceeds to decision block 110.

However, if the steering velocity magnitude does exceed 1 degree per second, then depending upon the steering velocity direction, a driver disturbance may be eminent. Thus, method 100 proceeds to decision block 114 where the command signal direction is compared to the steering velocity direction. If the command signal direction is the same as the steering velocity direction, no fault condition is presumed, since the readings could be indicative of a sudden steering maneuver by a driver. In this case, method 100 proceeds to block 110, as described earlier. On the other hand, if the command signal direction is the opposite of the steering velocity direction, a fault condition is generated at block 116.

Such a condition is indicative of a non-responsive motor 38 to a relatively strong command signal 82 in one direction, coupled with a relatively rapid return to center action in the opposite direction with no motor damping. Accordingly, method 100 further causes relay 84 (FIG. 3) to be de-energized, closing normally closed contacts 86 and 88, thereby shorting out motor windings 70 to provide damping. This, in turn, results in the steering system being deactivated and method 100 coming to an end.

Through the use of the above-described methodology, a previously difficult task of detecting open motor phase windings during the runtime of a steering system is addressed. Moreover, the ability to detect open phases in a four-wheel steering system having a return to center spring allows for the minimization of driver disturbance by subsequently closing the motor shorting relay. Thereby, the motor provides damping so as to resist a rapid return to center.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting a loss of motor control in a system, the method comprising:

determining a duty cycle of a command signal generated by a controller, said command signal for commanding a mechanism to be turned in either a first or a second direction, said second direction being opposite to said first direction;

determining a velocity of said steering mechanism, said velocity characterized by a velocity magnitude and a velocity direction whenever said velocity is greater than zero, wherein said velocity direction corresponds to either said first or said second direction;

comparing said duty cycle to a first selected value;

comparing said velocity magnitude to a second selected value; and if said duty cycle exceeds said first selected value, said velocity magnitude exceeds said second selected value, and said velocity direction is opposite to the direction commanded by said command signal, then generating a fault signal.

2. The method of claim 1, wherein:

said command signal is a steering command signal; and said mechanism is a steering mechanism.

3. The method of claim 2, further comprising short-circuiting the open motor phase windings in response to said fault signal.

4. The method of claim 3, wherein said fault signal causes a motor shorting relay to be de-energized, thereby causing the open motor phase windings to be short-circuited.

5. The method of claim 2, wherein said first selected value is about 80%.

6. The method of claim 5, wherein said second selected value is about 1 degree per second.

7. A storage medium encoded with a machine readable computer program code for detecting open motor phase windings in an electric power steering system, the storage medium including instructions for causing a computer to implement a method, the method comprising:

determining a duty cycle of a steering command signal generated by a controller, said steering command signal for commanding a steering mechanism to be turned in either a first or a second direction, said second direction being opposite to said first direction;

determining a steering velocity of said steering mechanism, said steering velocity characterized by a steering velocity magnitude and a steering velocity direction whenever said steering velocity is greater than zero, wherein said steering velocity direction corresponds to either said first or said second direction;

comparing said duty cycle to a first selected value;

comparing said steering velocity magnitude to a second selected value; and if said duty cycle exceeds said first selected value, said steering velocity magnitude exceeds said second selected value, and said steering velocity direction is opposite to the direction commanded by said steering command signal, then generating a fault signal.

8. The storage medium of claim 7, further comprising short-circuiting the open motor phase windings in response to said fault signal.

9. The storage medium of claim 8, wherein said fault signal causes a motor shorting relay to be de-energized, thereby causing the open motor phase windings to be short-circuited.

10. The storage medium of claim 7, wherein said first selected value is about 80%.

11. The storage medium of claim 10, wherein said second selected value is about 1 degree per second.

12. A computer data signal for detecting open motor phase windings in an electric power steering system, the computer data signal comprising code configured to cause a processor to implement a method, the method comprising:

determining a duty cycle of a steering command signal generated by a controller, said steering command signal for commanding a steering mechanism to be turned in either a first or a second direction, said second direction being opposite to said first direction;

determining a steering velocity of said steering mechanism, said steering velocity characterized by a steering velocity magnitude and a steering velocity direction whenever said steering velocity is greater than zero, wherein said steering velocity direction corresponds to either said first or said second direction;

comparing said duty cycle to a first selected value;

comparing said steering velocity magnitude to a second selected value; and if said duty cycle exceeds said first selected value, said steering velocity magnitude exceeds said second selected value, and said steering velocity direction is opposite to the direction commanded by said steering command signal, then generating a fault signal.

13. The computer data signal of claim 12, further comprising short-circuiting the open motor phase windings in response to said fault signal.

14. The computer data signal of claim 13, wherein said fault signal causes a motor shorting relay to be de-energized, thereby causing the open motor phase windings to be short-circuited.

15. The computer data signal of claim 12, wherein said first selected value is about 80%.

16. The computer data signal of claim 15, wherein said second selected value is about 1 degree per second.

17. A vehicle steering mechanism, comprising:

an electric motor operably engaged with a steering rack;

a controller, said controller providing a steering command signal to said electric motor for translating said steering rack in either a first or a second direction, said second direction being opposite to said first direction;

said controller further determining a steering velocity of the steering mechanism, said steering velocity characterized by a steering velocity magnitude and a steering velocity direction whenever said steering velocity is greater than zero, wherein said steering velocity direction corresponds to either said first or said second direction;

said controller further comparing a duty cycle of said steering command signal to a first selected value and comparing said steering velocity magnitude to a second selected value; and if said duty cycle exceeds said first selected value, said steering velocity magnitude exceeds said second selected value, and said steering velocity direction is opposite to the direction commanded by said steering command signal, then said controller further generates a fault signal.

18. The steering system of claim 17, wherein said controller short-circuits open motor phase windings in response to said fault signal.

19. The steering system of claim 18, wherein said fault signal causes a motor shorting relay to be de-energized, thereby causing said open motor phase windings to be short-circuited.

20. The steering system of claim 17, wherein said first selected value is about 80%.

21. The steering system of claim 20, wherein said second selected value is about 1 degree per second.

* * * * *